(12) United States Patent
Chau et al.

(10) Patent No.: US 9,764,537 B2
(45) Date of Patent: Sep. 19, 2017

(54) HOT MELT SYSTEMS, FEEDER DEVICES AND METHODS FOR MOVING PARTICULATE HOT MELT ADHESIVE

(71) Applicant: NORDSON CORPORATION, Westlake, OH (US)

(72) Inventors: Sing Yi Chau, Atlanta, GA (US); Justin A. Clark, Sugar Hill, GA (US); William M. Ridge, Cumming, GA (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 14/973,949

(22) Filed: Dec. 18, 2015

(65) Prior Publication Data

US 2016/0101611 A1 Apr. 14, 2016

Related U.S. Application Data

(62) Division of application No. 13/804,754, filed on Mar. 14, 2013, now Pat. No. 9,266,681.
(Continued)

(51) Int. Cl.
*B32B 37/12* (2006.01)
*B65G 19/04* (2006.01)
(Continued)

(52) U.S. Cl.
CPC ...... *B32B 37/1284* (2013.01); *B05C 11/1002* (2013.01); *B05C 11/1042* (2013.01);
(Continued)

(58) Field of Classification Search
CPC ........ B32B 37/1284; B32B 2037/1215; B65G 19/14; B65G 19/04; B29C 31/02;
(Continued)

(56) References Cited

U.S. PATENT DOCUMENTS 2,547,868 A * 4/1951 Judson .................. A01C 15/16
222/242
2,612,298 A * 9/1952 Wearne .................. C10B 31/04
202/262
(Continued)

FOREIGN PATENT DOCUMENTS

DE 2461696 A1 7/1976
DE 2720694 A1 11/1978
(Continued)

OTHER PUBLICATIONS

Nordson Corporation, 1994 Adhesives and Sealants Equipment Catalog, Nordson Automatic Hopper/Feeder, 5 pgs.
(Continued)

Primary Examiner — Donnell Long
(74) Attorney, Agent, or Firm — Baker & Hostetler LLP

(57) ABSTRACT

Systems, feeder devices and methods for moving particulate hot melt adhesive from an adhesive supply to an adhesive melter. A feeder device includes a body having an inlet and an outlet, and an interior communicating with the inlet and the outlet. The inlet is configured to receive particulate hot melt adhesive from an outlet of the adhesive supply, and the outlet is configured to provide particulate hot melt adhesive to an inlet of the adhesive melter. The feeder device further includes a mechanical agitator positioned in the interior for urging the particulate hot melt adhesive in a flow direction toward the outlet.

29 Claims, 5 Drawing Sheets

Related U.S. Application Data

(60) Provisional application No. 61/712,414, filed on Oct. 11, 2012.

(51) Int. Cl.
| | | |
|---|---|---|
| *B05C 11/10* | (2006.01) | |
| *B29B 13/02* | (2006.01) | |
| *B29C 31/02* | (2006.01) | |
| *B29C 31/04* | (2006.01) | |
| *B65G 19/14* | (2006.01) | |

(52) U.S. Cl.
CPC ............ *B29B 13/022* (2013.01); *B29C 31/02* (2013.01); *B29C 31/048* (2013.01); *B65G 19/04* (2013.01); *B65G 19/14* (2013.01); *B32B 2037/1215* (2013.01)

(58) Field of Classification Search
CPC . B29C 31/048; B29B 13/022; B05C 11/1042; B05C 11/1002
USPC .... 222/196, 146.5, 236, 410, 414, 226, 239, 222/559, 561
See application file for complete search history.

(56) References Cited

U.S. PATENT DOCUMENTS

| | | | |
|---|---|---|---|
| 2,744,792 A | | 5/1956 | Finn et al. |
| 2,827,204 A | * | 3/1958 | McCurdy ............... B60P 1/003 222/505 |
| 3,239,103 A | | 3/1966 | Kelley et al. |
| 3,531,023 A | | 9/1970 | Mercer et al. |
| 3,659,579 A | | 5/1972 | Henderson et al. |
| 3,757,968 A | * | 9/1973 | Teske ................. B65G 65/4836 198/546 |
| 3,876,105 A | | 4/1975 | Kelling |
| 3,981,416 A | | 9/1976 | Scholl |
| 4,059,090 A | | 11/1977 | Shaw |
| 4,346,802 A | * | 8/1982 | Popper ................. B65D 88/66 198/533 |
| 4,453,867 A | | 6/1984 | Sharps |
| 4,532,961 A | | 8/1985 | Walton et al. |
| 4,666,066 A | | 5/1987 | Boccagno et al. |
| 4,724,983 A | | 2/1988 | Claassen |
| 4,773,568 A | * | 9/1988 | Schaefer ................. A01C 15/02 222/175 |
| 4,790,455 A | | 12/1988 | Dieringer et al. |
| 4,839,202 A | | 6/1989 | Grassel et al. |
| 5,375,747 A | * | 12/1994 | Yoshikawa ........ B65G 65/4836 222/410 |
| 5,378,089 A | * | 1/1995 | Law .......................... B01J 4/00 406/123 |
| 5,609,458 A | * | 3/1997 | Hanaoka ................. C10B 31/02 202/262 |
| 5,650,083 A | | 7/1997 | Bondeson et al. |
| 5,741,532 A | | 4/1998 | Lilly et al. |
| 5,791,830 A | | 8/1998 | Fort et al. |
| 5,909,829 A | | 6/1999 | Wegman et al. |
| 6,095,803 A | | 8/2000 | Slater |
| 6,196,417 B1 | | 3/2001 | Johnson et al. |
| 6,310,454 B1 | * | 10/2001 | Moran .................. G05B 13/027 177/25.13 |
| 7,152,761 B2 | * | 12/2006 | Baker ............... A61F 13/15626 222/161 |
| 7,586,738 B1 | | 9/2009 | Hartzel et al. |
| 7,626,143 B2 | | 12/2009 | Miller |
| 9,266,681 B2 | | 2/2016 | Chau et al. |
| 2003/0080156 A1 | | 5/2003 | Jeter et al. |
| 2003/0121274 A1 | | 7/2003 | Wightman |
| 2004/0084486 A1 | | 5/2004 | Raterman et al. |
| 2005/0098579 A1 | | 5/2005 | Dittmann et al. |
| 2005/0169494 A1 | | 8/2005 | Stiles et al. |
| 2007/0170209 A1 | * | 7/2007 | Lehmann ................. B01F 7/162 222/236 |
| 2007/0254583 A1 | | 11/2007 | Germagian et al. |
| 2009/0095730 A1 | | 4/2009 | Ganzer et al. |
| 2010/0155433 A1 | * | 6/2010 | Toyoda ............... B65G 65/4836 222/410 |
| 2013/0105517 A1 | | 5/2013 | Tix et al. |

FOREIGN PATENT DOCUMENTS

| | | |
|---|---|---|
| DE | 8704215 U1 | 5/1987 |
| EP | 485281 A1 | 5/1992 |
| WO | 8804984 A1 | 7/1988 |

OTHER PUBLICATIONS

Nordson Corporation, Adhesives and Sealants Equipment Guide (2001-2002), Vacuum Feed System, 12 pgs.
European Application No. 13187306: Extended European Search Report dated Dec. 10, 2015.
European Patent Office, International Search Report and Written Opinion in PCT Application Serial No. PCT/US2014/056376, Mar. 19, 2015, 19 pages.
Mexican Application No. MX/a/2013/011887: Third Office Action dated Sep. 14, 2016, 2 pages.

* cited by examiner

HOT MELT SYSTEMS, FEEDER DEVICES AND METHODS FOR MOVING PARTICULATE HOT MELT ADHESIVE

CROSS-REFERENCE TO RELATED APPLICATION

This application is a divisional application of U.S. patent application Ser. No. 13/804,754, filed Mar. 14, 2013, which claims the benefit of U.S. Provisional Patent Application No. 61/712,414 filed Oct. 11, 2012, the disclosures of which are hereby incorporated by reference herein.

FIELD OF THE INVENTION

The present invention generally relates to hot melt adhesive dispensing equipment, and more particularly to moving hot melt adhesive between an adhesive supply and an adhesive melter in a hot melt adhesive dispensing system.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of pellets or particulates and are contained in or provided from an adhesive supply, such as a tank or hopper. The hot melt adhesive pellets are heated and melted by a melter, and liquid hot melt adhesive is pumped to a dispenser, such as a dispensing gun or other applicator which applies the hot melt adhesive to a carton, case, or other objects or substrates. Hot melt adhesive, in its pre-melted state (referred to herein as "particulate" hot melt adhesive), can be provided in a variety of shapes and sizes, ranging from small bb-sized pieces, to larger sized pieces or chips, and still larger "pillows" that are several inches in dimension. Particulate hot melt adhesive must be moved from the adhesive supply to the melter, and the size and shape of the particulate hot melt adhesive and the construction of the adhesive supply and the melter can present challenges that affect this movement.

For example, air-driven, or pneumatic, feed systems use the force of flowing air to move particulate hot melt adhesive from an adhesive supply to a melter. In a known arrangement, a transfer hose connects the adhesive supply with the melter, and an air pump is operated to generate an air flow that moves particulate hot melt adhesive through the transfer hose from the adhesive supply to the melter. However, such pneumatic feed systems have a limit relative to the size of particulate hot melt adhesive they can transfer in a cost effective manner. Larger-dimension particulate hot melt adhesives, including larger pellets, chips, and pillows require a larger-diameter transfer hose than comparatively smaller-sized particulate hot melt adhesives, and also require greater air flow, which can necessitate using a higher performance air pump. In addition, the transfer hose typically connects with a lid on the melter, but heat generated by the melter is transferred to the lid and to adjacent portions of the transfer hose. Transferring heat to the lid and transfer hose can cause premature heating or melting of the hot melt adhesive before it reaches the melter. This can cause problems such as interference with the proper transfer of hot melt adhesive into the melter. Also, air-driven feed systems often include an air filter, which requires periodic replacement or cleaning, and therefore results in system downtime. Furthermore, large bins used as the adhesive supply in air-driven feed systems undesirably increase the overall floor space requirements of the system. In addition, the particulate hot melt adhesives in these large bins can become compacted and begin to stick together, forming larger clumps of particulate hot melt adhesive that are heavier and more difficult to transfer using an air-driven feed system. Further, larger clumps of particulate hot melt adhesive can cause blockages in the transfer hose, which interfere with transferring hot melt adhesive to the melter.

In addition, arrangements have been used where an adhesive supply is positioned directly above the heating elements of a melter, and the force of gravity causes the particulate hot melt adhesive to move downwardly through the adhesive supply to the melter. For example, a hopper can be positioned above the melter, with an outlet of the hopper being connected with an inlet of the melter, so that particulate hot melt adhesive in the hopper falls under its own weight through the outlet of the hopper and directly into the inlet of the melter. Such an arrangement can occupy a smaller footprint on a floor surface than the above-mentioned air-driven feed systems because the adhesive supply is not situated on a floor surface. However, because melters are heated systems, and because the hopper is directly above the melter, heat is transferred from the melter to the hopper, and the hopper becomes heated. Essentially, in such arrangements, the hopper acts as a chimney. Transferring heat to the hopper can cause premature heating or melting of the hot melt adhesive in the hopper, which can interfere with the efficient transfer of hot melt adhesive into the melter.

When feed systems are interrupted from transferring hot melt adhesive from an adhesive supply to a melter, the melter can be starved of new hot melt adhesive and the supply of liquid hot melt adhesive in the hot melt adhesive system can be diminished or completely depleted. This, as well as the other issues discussed above, contributes to downtime of the hot melt adhesive system.

There is a need, therefore, for feed systems for transferring particulate hot melt adhesive from an adhesive supply to a melter that address one or more of the drawbacks discussed above.

SUMMARY OF THE INVENTION

Embodiments of the present invention are directed to feeder devices for moving particulate hot melt adhesive between an adhesive supply and an adhesive melter, and related methods. In certain embodiments, feeder devices may include a mechanical agitator, such as in the form of an impeller, for moving particulate hot melt adhesive through the feeder device and toward the adhesive melter. In other embodiments, the feeder device may or may not include a mechanical agitator and a hot melt system is provided that includes an adhesive supply, a feeder device and an adhesive melter integrated as a unit with a housing structure. The adhesive supply is thermally isolated from the adhesive melter such that particulate hot melt adhesive in the supply remains relatively cool and unmelted during operation of the adhesive melter. The feeder device is used to intermittently supply adhesive from the hopper to the melter as needed.

According to one embodiment of the invention, a feeder device is provided for moving particulate hot melt adhesive from an adhesive supply to an adhesive melter. The feeder device includes a body having an inlet and an outlet, and an interior communicating with the inlet and the outlet. The inlet is configured to receive particulate hot melt adhesive from an outlet of the adhesive supply, and the outlet is configured to provide particulate hot melt adhesive to an inlet of the adhesive melter. The feeder device further includes a mechanical agitator positioned in the interior for urging the particulate hot melt adhesive in a flow direction toward the outlet.

According to another embodiment of the invention, a method is provided for moving particulate hot melt adhesive between an adhesive supply containing a bulk quantity of the particulate hot melt adhesive and an adhesive melter for heating and melting the particulate hot melt adhesive into a liquid hot melt adhesive. The method includes introducing the particulate hot melt adhesive into an inlet of a feeder device from the adhesive supply, and operating a mechanical agitator in the feeder device to move the particulate hot melt adhesive in a feed direction toward and through an outlet of the feeder device. The method further includes directing the particulate hot melt adhesive from the outlet into the adhesive melter.

According to another embodiment of the invention, a hot melt adhesive system is provided and includes an adhesive supply configured to contain a bulk quantity of particulate hot melt adhesive and having an outlet, and an adhesive melter configured to melt the particulate hot melt adhesive into a liquid hot melt adhesive and having an inlet. The hot melt adhesive system further includes a feeder device configured to move between a first position wherein the particulate hot melt adhesive can be directed from the adhesive supply to the adhesive melter and a second position wherein particulate hot melt adhesive cannot be directed to the adhesive melter. The feeder device includes a body having an inlet and an outlet and an interior communicating with the inlet and the outlet. The inlet is configured to receive particulate hot melt adhesive from the outlet of the adhesive supply, and the outlet is configured to provide particulate hot melt adhesive to the inlet of the adhesive melter in the first position.

According to another embodiment of the invention, a hot melt adhesive system is provided and includes a housing structure, an adhesive supply disposed within the housing structure and configured to contain a bulk quantity of particulate hot melt adhesive, and an adhesive melter disposed within the housing structure and configured to melt the particulate hot melt adhesive into a liquid hot melt adhesive. The adhesive supply and the adhesive melter are thermally isolated from each other such that particulate adhesive in the adhesive supply remains unmelted during operation of the adhesive melter. The hot melt adhesive system further includes a feeder device configured to intermittently direct particulate hot melt adhesive from the adhesive supply to the adhesive melter.

Hot melt adhesive systems, feeder devices and methods according to the present invention provide several advantages. For one, particulate hot melt adhesive can be reliably moved between an adhesive supply and an adhesive melter. In addition, the feeder devices are effective for moving particulate hot melt adhesives of varying sizes. Furthermore, the feeder devices provide a physical, thermal separation between an adhesive melter and an adhesive supply, such as by offsetting the adhesive supply from directly above the heating elements in the adhesive melter. Therefore, the feeder device is less likely to become fouled up than previous arrangements which transferred heat to the feeder device and caused premature heating or melting of the hot melt adhesive before it reached the melter. More generally, a self-contained hot melt adhesive system including an adhesive melter and an adhesive supply can be provided in a manner that thermally isolates the adhesive supply and the adhesive melter and allows the intermittent supply of particulate hot melt adhesive from the adhesive supply to the adhesive melter. Particulate hot melt adhesive in the hopper remains cool and unmelted, and may be fed as desired into the adhesive melter according to application needs. In addition, systems and devices employing the invention can require less maintenance and cause less downtime than previous arrangements. Moreover, the feeder devices can be integrated directly into adhesive supply and adhesive melter devices, or can be used as a separate component. In addition, a drive mechanism used with the feeder devices can both operate the mechanical agitator and move the feeder between positions.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Figure 2:
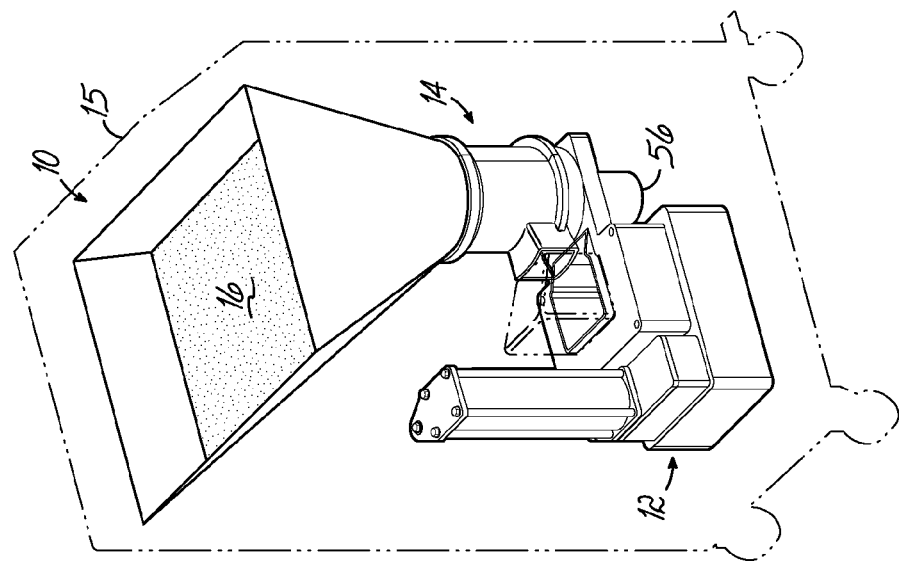
FIG. 2 is an isometric view of the machine of FIG. 1, with a housing structure removed to show an adhesive supply, a feeder device, and a melter.
Figure 1:
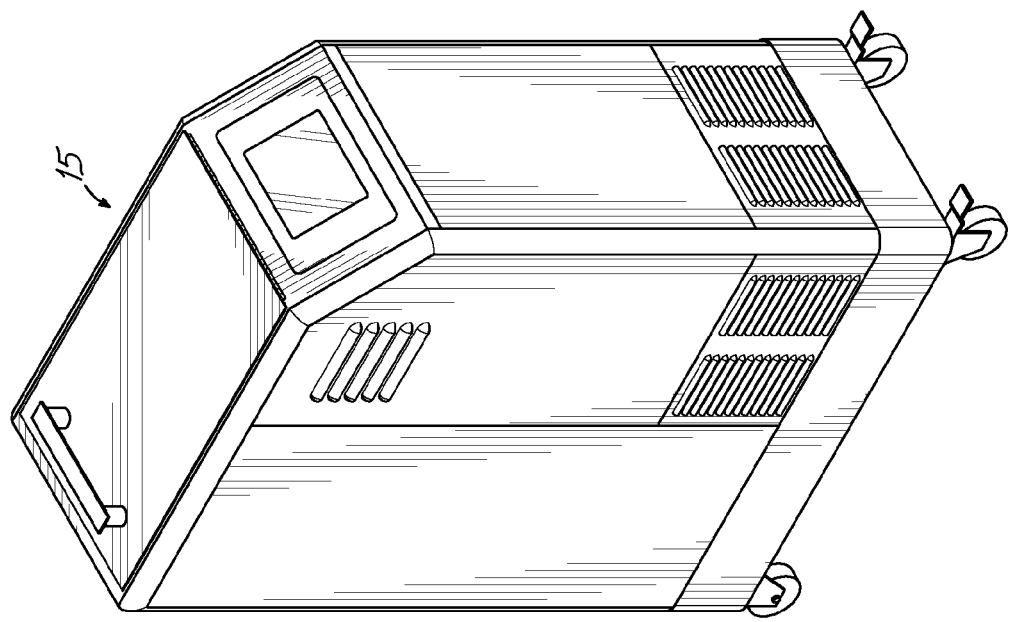
FIG. 1 is an isometric environmental view showing a machine embodying a hot melt adhesive system.

Referring first to FIGS. 1 and 2, components of an exemplary hot melt adhesive system are shown, including an adhesive supply 10 and a melter 12. A feeder device 14 is positioned generally between the adhesive supply 10 and the melter 12, and may be used to feed, or transfer, particulate hot melt adhesive 16 from the adhesive supply 10 to the melter 12. The adhesive supply 10 contains a bulk quantity of particulate hot melt adhesive 16, and can be a tank or hopper, for example. The melter 12 heats and melts the particulate hot melt adhesive 16 that is provided to the melter 12, turning it into a liquid hot melt adhesive that is directed to one or more points of application using devices and methods well known in the art.

Although FIGS. 1 and 2 depict the adhesive supply 10, the adhesive melter 12, and the feeder device 14 all contained within or connected with a single common housing structure 15, or housing, of a machine, it will be appreciated that various embodiments of the invention may not necessitate such a self-contained or integrated housing. Alternatively, the housing structure may take on various forms and may have individual housing components that collectively form a self-contained system.

Figure 4:
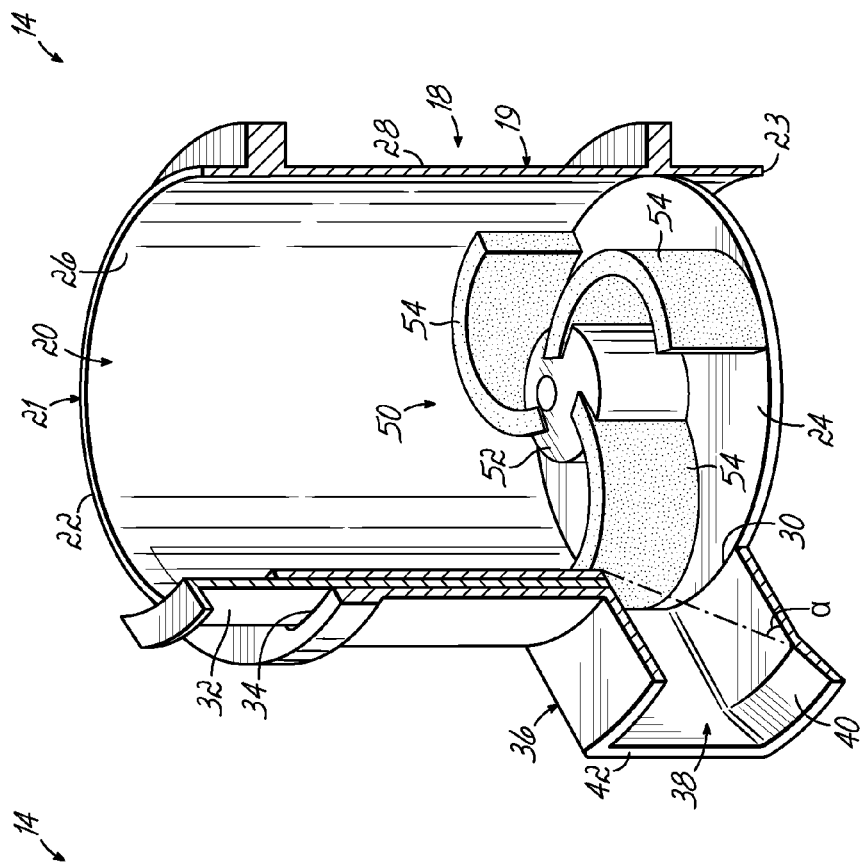
FIG. 4 is an isometric view in partial section showing additional features of the feeder device of FIGS. 2 and 3.
Figure 3:
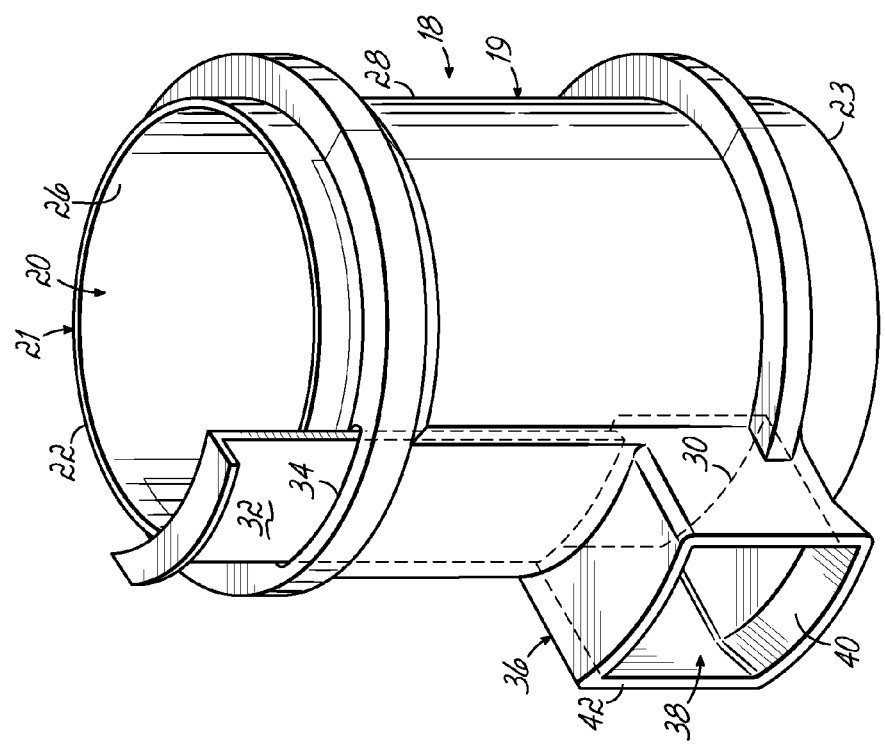
FIG. 3 is an isometric view of the feeder device of FIG. 2.

Referring next to FIGS. 3 and 4, features of the feeder device 14 are shown in greater detail. The feeder device 14 has a body 18 having a main portion 19 having a generally cylindrical shape. The main portion 19 has an interior 20 communicating with an inlet 21 at an upper first end 22 of the body 18. The main portion 19 includes a floor or base surface 24 that is generally proximate a lower second end 23 of the body 18. The interior 20 extends in the main portion 19 generally between the first end 22 and the base surface 24.

The body 18 is configured to mate with an outlet of the adhesive supply 10, such as in the vicinity of the first end 22, so that the inlet 21 can receive particulate hot melt adhesive 16 from the adhesive supply 10. For example, and as shown in FIG. 2, the adhesive supply 10 is positioned generally above the feeder device 14 and particulate hot melt adhesive 16 in the adhesive supply 10 is gravity fed into the feeder device 14. It will be appreciated that the adhesive supply 10 merely holds a supply of particulate hot melt adhesive 16 and directs the adhesive 16 toward the feeder device 14, and does not contain heating elements. Similarly, the feeder device 14 transfers the particulate hot melt adhesive 16, but does not contain heating elements.

The main portion 19 of the feeder device 14 includes an interior wall 26 and an exterior wall 28, with the interior wall 26 partially defining the interior 20. An opening 30 is provided through the side of the main portion 19 and through the interior and exterior walls 26, 28 generally proximate the base surface 24 and the second end 23. As will be explained more fully below, the opening 30 serves as part of an outlet for particulate hot melt adhesive 16 that moves through the feeder device 14.

A flow adjustment member is operably coupled with the body 18 and is configured to adjust the flow of particulate hot melt adhesive material 16 through the feeder device 14. For example, and as shown in the figures, the flow adjustment member is in the form of an adjustable gate 32 that can be used to control the height of the opening 30 that is actually open. As shown, the adjustable gate 32 has a generally curved shape that generally matches the contour of the body 18 and is slidably positioned within a slot 34 formed in the body 18. To increase the portion of the opening 30 that particulate hot melt adhesive 16 can move through, the adjustable gate 32 is moved upwardly in the direction of the first end 22. Alternatively, to decrease the portion of the opening 30 that particulate hot melt adhesive 16 can move through, the adjustable gate 32 is moved downwardly in the direction of the second end 23. The adjustable gate 32 can be adjusted between entirely closed and entirely open positions, whereby in the entirely closed position, particulate hot melt adhesive 16 is blocked from moving through the opening 30, and in the entirely open position, particulate hot melt adhesive 16 can move through the entire opening 30. A friction fit between the adjustable gate 32 and the body 18 generally prevents the gate 32 from moving without being deliberately moved by an operator, such as to preserve the position of the adjustable gate 32.

The body 18 also includes a throat portion 36 extending away from the main portion 19, such as in the vicinity of the opening 30. The throat portion 36 communicates with the interior 20 and further serves as part of an outlet for particulate hot melt adhesive 16 that moves through the feeder device 14. The throat portion 36, as shown, is a four-sided tubular structure, with an internal passageway 38 that is generally aligned with and approximately the same size as the opening 30 near the exterior wall 28. The throat portion 36 receives particulate hot melt adhesive 16 that moves through the opening 30. The adjustable gate 32 is positioned generally between the throat portion 36 and the main portion 19 so as to control the movement of particulate hot melt adhesive 16 from the interior 20 of the main portion 19 through the opening 30 and into the passageway 38 of the throat portion 36. The throat portion 36 can have a downwardly sloped bottom wall 40, as shown, to assist in movement of particulate hot melt adhesive 16 through the passageway 38. The throat portion 36 includes an outlet 42 at a distal end thereof, away from the main portion 19. The outlet 42 is an outlet of the feeder device 14 and is configured to provide particulate hot melt adhesive 16 to the melter 12.

As shown in FIG. 4, the adjustable gate 32 can be used to define an outlet angle $\alpha$, which represents the slope of a mound of particulate hot melt adhesive 16 in the body 18 as it spills over through the opening 30 and into the passageway 38 of the throat portion 36. For a steeper outlet angle $\alpha$, the adjustable gate 32 is moved upwardly, and for a shallower outlet angle $\alpha$, the adjustable gate 32 is moved downwardly. The adjustable gate 32, by controlling the flow of particulate hot melt adhesive 16 out of the main portion 19, controls the flow of particulate hot melt adhesive 16 through the outlet 42 of the body 18.

The feeder device 14 also includes a mechanical agitator for encouraging the movement of particulate hot melt adhesive 16 through the feeder device 14 from the inlet 21 to the outlet 42. In particular, the mechanical agitator has at least one moving element that contacts and moves the particulate hot melt adhesive 16. In the embodiment shown, the mechanical agitator includes an impeller 50 centrally positioned in the interior 20 of the body 18, generally proximate the base surface 24. The impeller 50 includes a central hub 52 and radially extending vanes 54. The impeller 50 is configured to rotate, so that the vanes 54 contact the particulate hot melt adhesive 16 in the interior 20 and move it out of the body 18. In particular, rotation of the impeller 50 causes the vanes 54 to urge particulate hot melt adhesive 16 through the opening 30 and into the throat portion 36. As particulate hot melt adhesive 16 is urged by the impeller 50 through the opening 30, additional particulate hot melt adhesive 16 from above the impeller 50 moves downwardly in the feeder device 14 and into the pathway of the vanes 54, which is then urged by the impeller 50 through the opening 30.

Advantageously, the vanes 54 are made of a flexible material and thereby resiliently contact particulate hot melt adhesive material 16. The flexible vanes 54 can move past or disturb pieces or clumps of particulate hot melt adhesive 16, thereby making it less likely that a piece or clump will cause the feeder device 14 to jam and lock. In addition, the flexible vanes 54 are effective for moving particulate hot melt adhesive of various sizes, including the bbs, pellets, chips, and pillows discussed above. Also, the vanes 54 can extend the entire distance from the central hub 52 to the interior wall 26 of the main portion 19 and to the base surface 24, so as to reach all portions of the interior 20 in the vicinity of the impeller 50. Of course, other configurations for the vanes 54 are also possible. Although not visible in FIGS. 3 and 4, the impeller 50 includes structure for mating with a drive device that provides rotational movement for the impeller 50, such as on the opposite side of the base surface 24 from the central hub 52 and the vanes 54. For example, a drive device in the form of a motor 56 (FIG. 1) can provide the rotational movement of the impeller 50.

In use, particulate hot melt adhesive 16 in the adhesive supply 10 moves downwardly through an outlet of the adhesive supply 10 and is received in the inlet 21 of the body 18 of the feeder device 14. The particulate hot melt adhesive 16 fills the interior 20 of the main portion 19 of the body 18 down to the base surface 24. While some of the particulate hot melt adhesive 16 might naturally move out of the opening 30 and into the throat portion 36, activation of the impeller 50 causes a more consistent movement. In particular, rotation of the impeller 50 causes the vanes 54 to contact pieces of particulate hot melt adhesive 16 in the interior 20 of the main portion 19 and to urge those pieces of particulate hot melt adhesive 16 in a flow direction toward and through the opening 30. The particulate hot melt adhesive 16 is urged into the passageway 38 of the throat portion 36, and as this process continues, the rotation of the impeller 50 maintains positive pressure in the flow direction so that the particulate hot melt adhesive 16 is urged completely through the passageway 38 toward and out through the outlet 42, where it is provided to the melter 12.

Advantageously, the adhesive supply 10 is positioned generally above the feeder device 14, thereby allowing the particulate hot melt adhesive 16 that is in the feeder device 14 to be gravity fed into the feeder device 14. This presents an efficient method for transporting the particulate hot melt adhesive 16. Particularly, gravity feeding the particulate hot melt adhesive 16 from the adhesive supply 10 to the feeder device 14 allows many sizes and shapes of particulate hot melt adhesive 16, including the bb's, pellets, chips, and pillows discussed above, to be easily moved, and does not require an air pump like air-driven feed systems.

The feeder device 14 provides a physical, thermal separation or isolation between the adhesive supply 10 and the melter 12, thereby diminishing heat transfer from the melter 12 to the adhesive supply 10. In particular, the adhesive supply 10 is not connected directly with the melter 12. This tends to diminish the amount of heat that is transferred from the melter 12 to the adhesive supply 10. In addition, the feeder device 14 is positioned generally above, but offset from directly above, the melter 12 (FIG. 2). An air gap is therefore provided generally between the melter 12 and the feeder device 14. This reduces the amount of heat that emanates from the melter 12 and that can reach the particulate hot melt adhesive 16 contained in the feeder device 14 and the adhesive supply 10. The air gap thermally separates the melter 12 from the feeder device 14 (and its contents) and from the adhesive supply 10.

In addition, components of the feeder device 14, including the main portion 19, the throat portion 36, the impeller 50, and the adhesive supply 10 may be constructed of thermally insulating materials, such as plastic, or other appropriate materials. Again, the adhesive supply 10 is not connected directly with the melter 12, but has the feeder device 14 between the adhesive supply 10 and melter 12. Through this indirect connection the amount of heat that is transferred from the melter 12 to the adhesive supply 10 is diminished. Constructing the feeder device 14 of thermally insulating materials will further reduce the amount of heat transferred from the melter 12 to the adhesive supply 10.

In addition, by using a throat portion 36 that extends from the side of the main portion 19, the interior 20 of the feeder device 14 and the particulate hot melt adhesive 16 contained therein are offset from a position directly above the heating elements of the melter 12. Alternatively, the feeder device 14 might not include the throat portion 36, in which case the opening 30 in the body 18 serves as the outlet of the feeder device 14. Because the particulate hot melt adhesive is moved out of the opening 30, which is in the side of the main portion 19, the feeder device 14 can still be positioned so that the interior 20 and the particulate hot melt adhesive 16 contained therein are still offset from directly above the heating elements of the melter 12. In either case, offsetting the interior 20 of the feeder device 14 from directly above the heating elements of the melter 12 also advantageously contributes to the thermal separation between the melter 12 and the feeder device 14 and tends to diminish the amount of heat that is transferred from the melter 12 to the adhesive supply 10.

By thermally separating the adhesive supply 10, the feeder device 14, and the melter 12 in this way, and diminishing the transfer of heat therebetween, particulate hot melt adhesive 16 is less likely to prematurely heat or melt in the adhesive supply 10 or the feeder device 14. Therefore, particulate hot melt adhesive 16 in the adhesive supply 10 is not, or only minimally, heated and remains unmelted during operation of the melter 12. This means that is less likely that the adhesive supply 10 and the feeder device 14 will become fouled up by melted hot melt adhesive. It will be appreciated that in other embodiments, various other manners of providing thermal isolation between the supply 10 and the melter 12 may be used in combination with or in place of what is described above.

While the feeder device 14 is shown as a separate component from the adhesive supply 10 and melter 12, the feeder device 14 can also be integrated into an adhesive supply or a melter so as to provide one of those components with an integrated feeder device. Moreover, while the mechanical agitator used in the embodiment shown is an impeller, other mechanical agitators could also be used, nonlimiting examples of which include a continuous screw device, a vibrating device, a belt device, a ram device, an oscillating device, and a whip device. Also, while the base surface 24 is generally perpendicular with a major length axis of the feeder device 14, other configurations are also possible, such as where the base surface 24 slopes downwardly from the upper first end 22 toward the opening 30. In addition, while the flow adjustment member shown is an adjustable gate, other types of flow adjustment members could also be used, and the flow adjustment member could also be situated in a position other than between the throat portion 36 and the main portion 19. While the embodiment shown in the figures includes a mechanical agitator that is associated with a motor as a drive device, various other types of drive devices might also be used depending on the type of mechanical agitator, including air cylinders, hydraulic actuators, and the like. Moreover, combinations of the various features disclosed herein can also be used.

Figure 5:
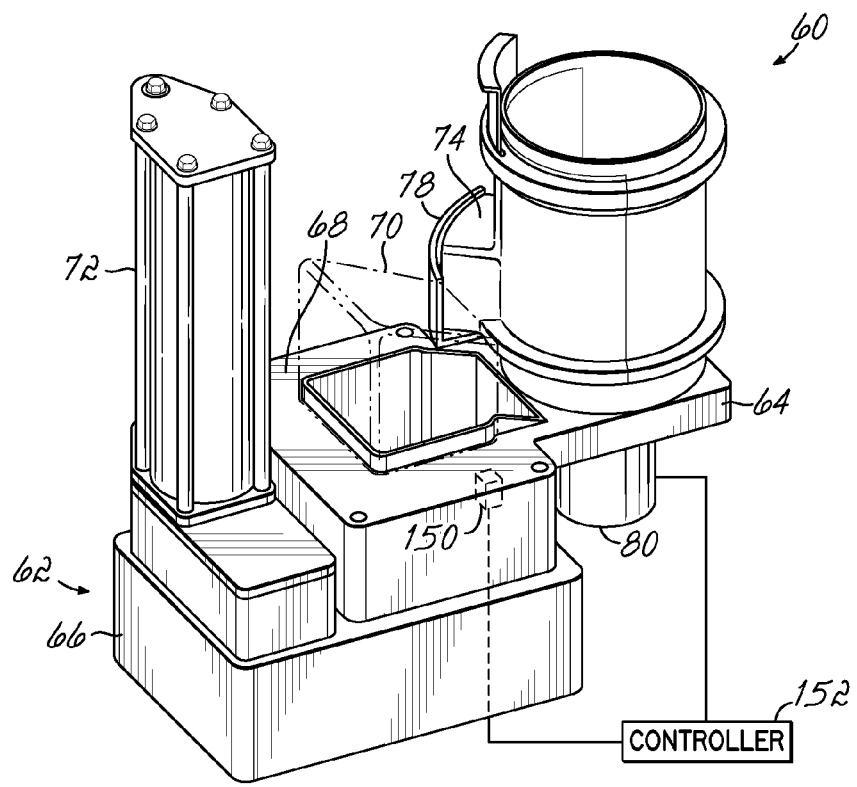
FIG. 5 is an isometric view showing a feeder device constructed according to another embodiment of the present invention, the feeder device being mounted on a melter and oriented in a home position.
Figure 6:
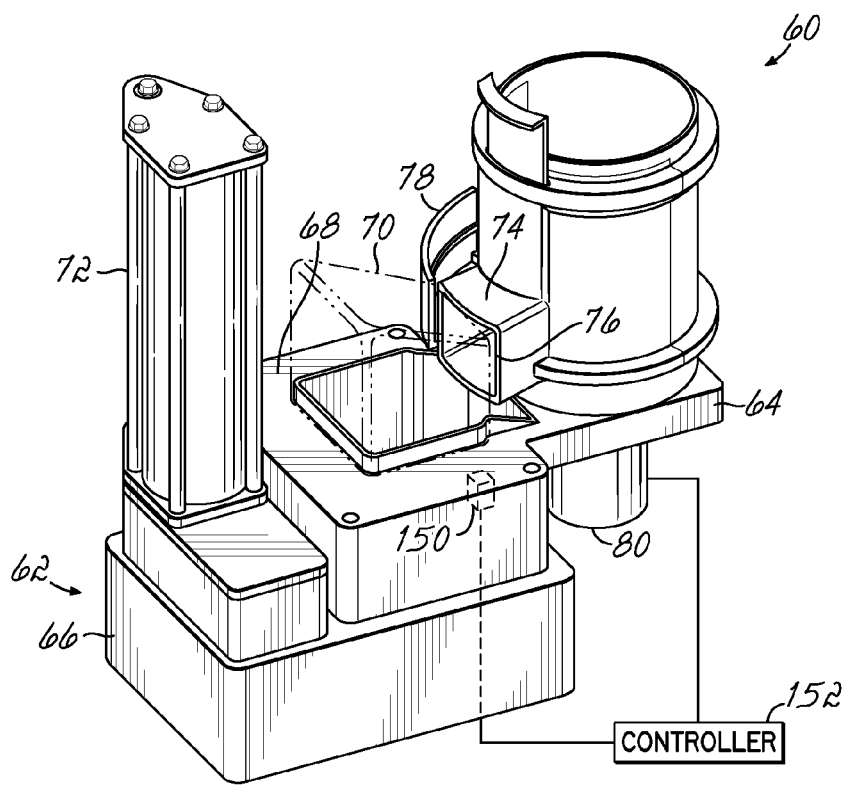
FIG. 6 is a view like FIG. 5, but with the feeder device being oriented in a feed position.

Referring next to FIGS. 5 and 6, a feeder device 60 constructed according to another embodiment of the invention is shown. The feeder device 60 shares many of the features of the feeder device 14 discussed above, and is mounted on an adhesive melter 62, which is also substantially similar to the melter 12 shown in FIG. 2. Particularly, the feeder device 60 is mounted on a platform 64 of the adhesive melter 62, and is moveable between two positions on the platform 64: a "home position" of the feeder device 60 is shown in FIG. 5, and a "feed position" of the feeder device 60 is shown in FIG. 6. The feeder device 60 is configured to be coupled with an adhesive supply of particulate hot melt adhesive, as described above for the feeder device 14 and the adhesive supply 10.

The melter 62 includes a plurality of heating elements (not shown) for melting particulate hot melt adhesive material and a heated reservoir 66. The heating elements may be cycled on and off, as appropriate, to maintain appropriate temperature conditions for hot melt adhesive in the melter 62, including in the reservoir 66. The heated reservoir 66 has a generally open top portion 68 that serves as an inlet to the heated reservoir 66 and is partially covered by a hood 70. The melter 62 also includes a pump 72 associated with the heated reservoir 66 for pumping the liquid hot melt adhesive, such as toward a point of application.

The platform 64 of the melter 62 extends to the side and away from the heated reservoir 66. The platform 64 supports the feeder device 60 in a position that is not directly above the heating elements or the heated reservoir 66. Particularly, the feeder device 60 is not directly above the open top portion 68, or inlet, of the heated reservoir 66 of the melter 62. Thus, the feeder device 60 is generally offset from directly above the heated components of the melter 62 so that heat does not rise directly into the path of the feeder device 60.

In the home position (FIG. 5), a throat portion 74 of the feeder device 60 is positioned away from the open top portion 68 of the heated reservoir 66. Thus, in the home position an outlet 76 of the feeder device 60 in the throat portion 74 is positioned generally away from the open top portion 68. Therefore, in the home position, the feeder device 60 is not configured to provide particulate hot melt adhesive into the heated reservoir 66. In addition, a shield 78 is provided to block the outlet 76 of the feeder device 60 to prevent particulate hot melt adhesive from spilling. In particular, the shield 78 can be mounted on the platform 64 and can prevent particulate hot melt adhesive from spilling from the throat portion 74 of the feeder device 60.

In the feed position (FIG. 6), in contrast, the feeder device 60 is configured to provide particulate hot melt adhesive into the heated reservoir 66. In particular, the throat portion 74 is positioned so that the outlet 76 is generally within the hood 70 and above the open top portion 68 of the heated reservoir 66. Thus, in the feed position the outlet 76 is positioned proximate the open top portion 68, so as to provide particulate hot melt adhesive to the heated reservoir 66. Particulate hot melt adhesive that moves through the feeder device 60, including the throat portion 74, is provided into the open top portion 68 of the heated reservoir 66 where it can be melted into liquid hot melt adhesive.

Movement of the feeder device 60 between the home and feed positions can be by rotation of the feeder device 60 on the platform 64, or by any other suitable means. For example, movement of the feeder device 60 may be caused by a drive device, such as a motor 80. The platform 64, the shield 78, and other components shown in FIGS. 5 and 6 may be constructed of materials that provide thermal insulation to reduce the transfer of heat from the melter 62 to the feeder device 60 according to the principles described above.

Advantageously, moving the feeder device 60 between home and feed positions provides a further level of control over when particulate hot melt adhesive is advanced from the feeder device 60 to the melter 62, in addition to the control already provided by the operation of the feeder device 60. In particular, by moving the feeder device 60 to the home position, the flow of particulate hot melt adhesive to the melter 62 can be abruptly stopped because the outlet 76 is moved so as to no longer provide the particulate hot melt adhesive into the melter 62. In addition, the shield 78 can prevent particulate hot melt adhesive from exiting the throat portion 74, which can prevent waste. Moreover, the feeder device 60 can be moved to the feed position prior to advancing particulate hot melt adhesive from the feeder device 60 to the melter 62, for example.

Figure 7:
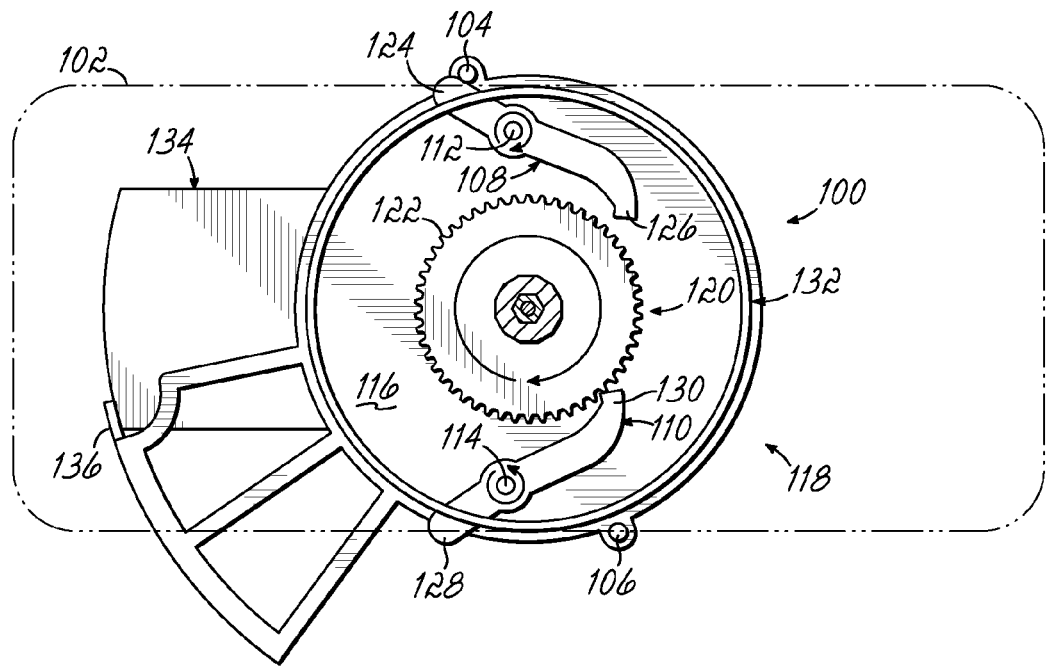
FIG. 7 is a bottom plan view showing features of a feeder device constructed according to a further embodiment of the present invention, the feeder device being mounted on a platform and oriented in the feed position like in FIG. 6.
Figure 8:
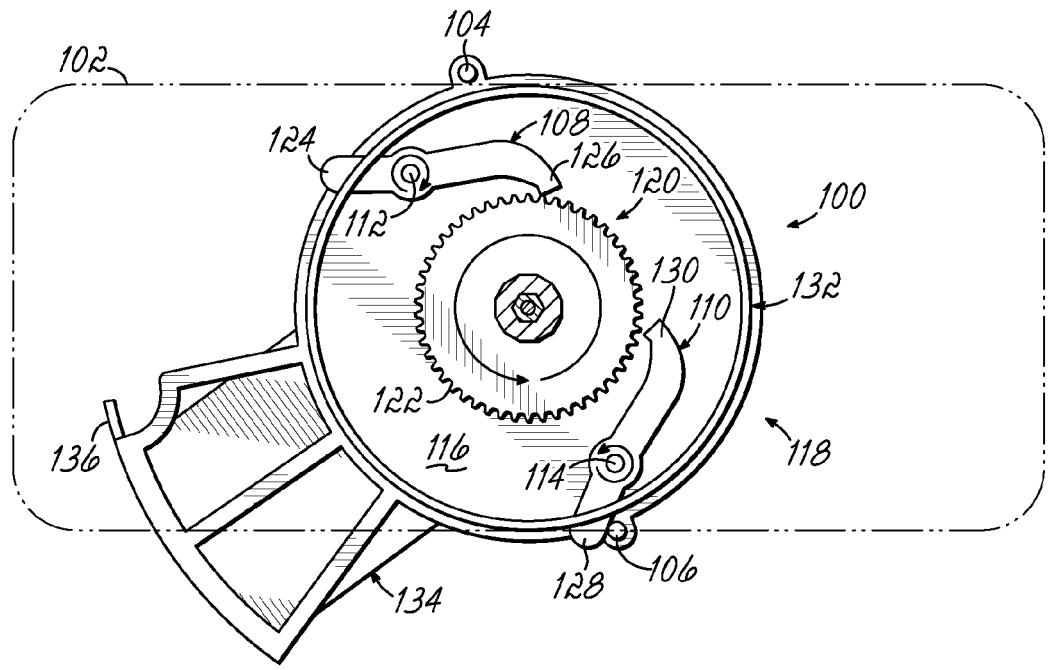
FIG. 8 is a view like FIG. 7, but with the feeder device being oriented in the home position like in FIG. 5.

Referring next to FIGS. 7 and 8, features of a feeder device 100 constructed according to a further embodiment of the invention are shown. The feeder device 100 shares many of the features of the feeder devices 14, 60 discussed above, and is rotatably mounted on a platform 102, which is substantially similar to the platform 64 of the melter 62 discussed above. FIGS. 7 and 8 are bottom views, with FIG. 7 showing the feeder device 100 in the feed position and FIG. 8 showing the feeder device 100 in the home position. The feeder device 100 is rotatably moveable between the feed and home positions.

Platform 102 includes first and second stops 104, 106 that relate to positioning the feeder device 100 in the feed and home positions, respectively. Stops 104, 106 are positioned on opposite sides of the platform 102 and are configured to engage first and second spring loaded pawls 108, 110 carried by the feeder device 100. The first and second pawls 108, 110 are pivotable and spring-biased around respective axles 112, 114.

Proximate to a lower region of the feeder device 100, such as proximate a lower second end 116, a drive mechanism 118 including a drive coupler 120 is provided for coupling a drive device (not shown) with an impeller (also not shown) to provide rotation to the impeller. The drive coupler 120 includes a pawl engagement ring 122 for selective engagement with the first and second pawls 108, 110. The first pawl 108 includes a stop engagement end 124 and a ring engagement end 126, and the second pawl 110 includes a stop engagement end 128 and a ring engagement end 130.

The first and second pawls 108, 110 are spring-biased in a direction toward the pawl engagement ring 122. For example, the first pawl 108 is spring-biased around its associated axle 112 so that its ring engagement end 126 tends to be in contact with the pawl engagement ring 122. Similarly, the second pawl 110 is spring-biased around its associated axle 114 so that its ring engagement end 130 tends to be in contact with the pawl engagement ring 122. When the first or second pawls 108, 110 engage the pawl engagement ring 122, relative motion of the drive coupler 120 causes the same relative motion of the body 132 of the feeder device 100. Conversely, when the first and second pawls 108, 110 do not engage the pawl engagement ring 122, relative motion of the drive coupler 120 only causes the same relative motion in the impeller, but not in the body 132.

The stop engagement ends 124, 128 extend slightly beyond the body 132 of the feeder device 100 and engage the first and second stops 104, 106 when the feeder device 100 is rotated toward and into the feed and home positions. As the feeder device 100 is rotated toward the feed position, the first pawl 108 is in engagement with the pawl engagement ring 122, so that rotation of the drive coupler 120 in the clockwise direction causes the entire body 132 to rotate in the clockwise direction. When the stop engagement end 124 of the first pawl 110 reaches the first stop 104, the first pawl 110 is rotated about its axle 112, causing its ring engagement end 126 to come out of engagement with the pawl engagement ring 122. The ring engagement end 130 of the second pawl 110 slips when the drive coupler 120 is rotated in this same clockwise direction and therefore does not engage the pawl engagement ring 122. Consequently, continued clockwise rotation of the drive coupler 120 only causes rotation of the impeller, but not of the body 132. Also, engagement between the stop engagement end 124 and the first stop 104 prevents further clockwise rotation of the body 132.

Conversely, as the feeder device 100 is rotated toward the home position, the second pawl 110 is in engagement with the pawl engagement ring 122, so that rotation of the drive coupler 120 in the counter-clockwise direction causes the entire body 132 to rotate in the counter-clockwise direction. When the stop engagement end 128 of the second pawl 110 reaches the second stop 106, the second pawl 110 is rotated about its axle 114, causing its ring engagement end 130 to come out of engagement with the pawl engagement ring 122. The ring engagement end 126 of the first pawl 108 slips when the drive coupler 120 is rotated in this same counter-clockwise direction and therefore does not engage the pawl engagement ring 122. Consequently, continued counter-clockwise rotation of the drive coupler 120 only causes rotation of the impeller, but not of the body 132. Also, engagement between the stop engagement end 128 and the second stop 106 prevents further counter-clockwise rotation of the body 132.

In use, the feeder device 100 can be selectively moved between the feed and home positions using the same drive device that provides the rotation of the impeller. From the home position and as the drive coupler 120 rotates in the clockwise direction, the first pawl 108 engages with the pawl engagement ring 122. As the drive device turns the drive coupler 120 in the clockwise direction shown in FIG. 7, the engagement between the first pawl 108 and the pawl engagement ring 122 causes the entire body 132 to rotate in the same clockwise direction. Rotation of the body 132 ceases when the stop engagement end 124 of the first pawl 108 strikes the first stop 104, releasing the ring engagement end 126 from engagement with the pawl engagement ring 122. Thereafter, continued clockwise rotation of the drive coupler 120 by the drive device causes rotation of the impeller, which is advantageous for operating the feeder device 100 and transferring particulate hot melt adhesive from the adhesive supply to the melter, as discussed above. The position of the first stop 104 on the platform 102 and the first pawl 108 on the body 132 can be selected so that their engagement occurs when the throat portion 134 of the feeder device 100 is positioned proximate an inlet of an associated melter.

When it is no longer desired to operate the impeller of the feeder device 100, the direction of rotation of the drive device can be reversed for a short period of time. From the feed position and as the drive coupler 120 rotates in the counter-clockwise direction, the second pawl 110 engages with the pawl engagement ring 122. As the drive device turns the drive coupler 120 in the counter-clockwise direction shown in FIG. 8, the engagement between the second pawl 110 and the pawl engagement ring 122 causes the entire body 132 to rotate in the same counter-clockwise direction. Rotation of the body 132 ceases when the stop engagement end 128 of the second pawl 110 strikes the second stop 106, releasing the ring engagement end 130 from engagement with the pawl engagement ring 122. Thereafter, continued counter-clockwise rotation of the drive coupler 120 by the drive device can be stopped, because the feeder device 100 has been moved to the home position. The position of the second stop 106 on the platform 102 and the second pawl 110 on the body 132 can be selected so that their engagement occurs when the throat portion 134 of the feeder device 100 is positioned away from an inlet of an associated melter, and perhaps aligned with a shield 136, as shown.

Thus, for both the feeder devices 60 and 100, the feeder devices can be rotated between the home and feed positions. This rotation can be provided by a drive device, such as a motor, as discussed above. In addition, the motor can also provide rotational movement to the mechanical agitator of each feed device, also as discussed above. Movement of the feeder devices to the home and feed positions can be caused in response to any condition or need of an associated hot melt adhesive system.

For example, and referring again to FIGS. 5 and 6, the heated reservoir 66 can include a melter level sensor 150 that senses the amount, or level, of hot melt adhesive in the reservoir 66. The level sensor 150 is operatively connected with a controller 152 which is also operatively connected with the motor 80. The motor 80, in turn, can be operatively connected with the feeder device 60 both to rotate the feeder device 60 to the home and feed positions, and to provide rotational movement of the impeller. The level sensor 150 can provide hot melt adhesive level information to the controller 152, which can control the motor 80 in response thereto. For example, if there is a low level of hot melt adhesive in the reservoir 66 and additional hot melt adhesive is needed, the low level of hot melt adhesive will be sensed by the level sensor 150 and communicated to the controller 152. The controller 152, in turn, can then activate the motor 80 to move the feeder device 60 into the feed position and to provide rotational movement to the impeller, thereby moving additional hot melt adhesive from the feeder device 60 into the reservoir 66. Operation of the motor 80 to provide hot melt adhesive from the feeder device 60 to the reservoir 66 can continue until the hot melt adhesive level measured by the level sensor 150 reaches an appropriate level as determined by the controller 152. Once an appropriate level of hot melt adhesive in the reservoir 66 is reached, the controller 152 can activate the motor 80 to move the feeder device 60 into the home position and to cease providing rotational movement to the impeller, thereby stopping the transfer of particulate hot melt adhesive from the feeder device 60 into the reservoir 66.

Advantageously, the controller 152 can be configured so that it activates the motor 80 in order to supply appropriate amounts of particulate hot melt adhesive to the reservoir 66. For example, the controller 152 can activate the motor 80 so that only small amounts of particulate hot melt adhesive are dispensed from the feeder device 60 to the reservoir 66 at any one time in order to avoid shocking the liquid hot melt adhesive in the reservoir 66 with a large amount of comparatively cooler particulate hot melt adhesive.

Figure 9:
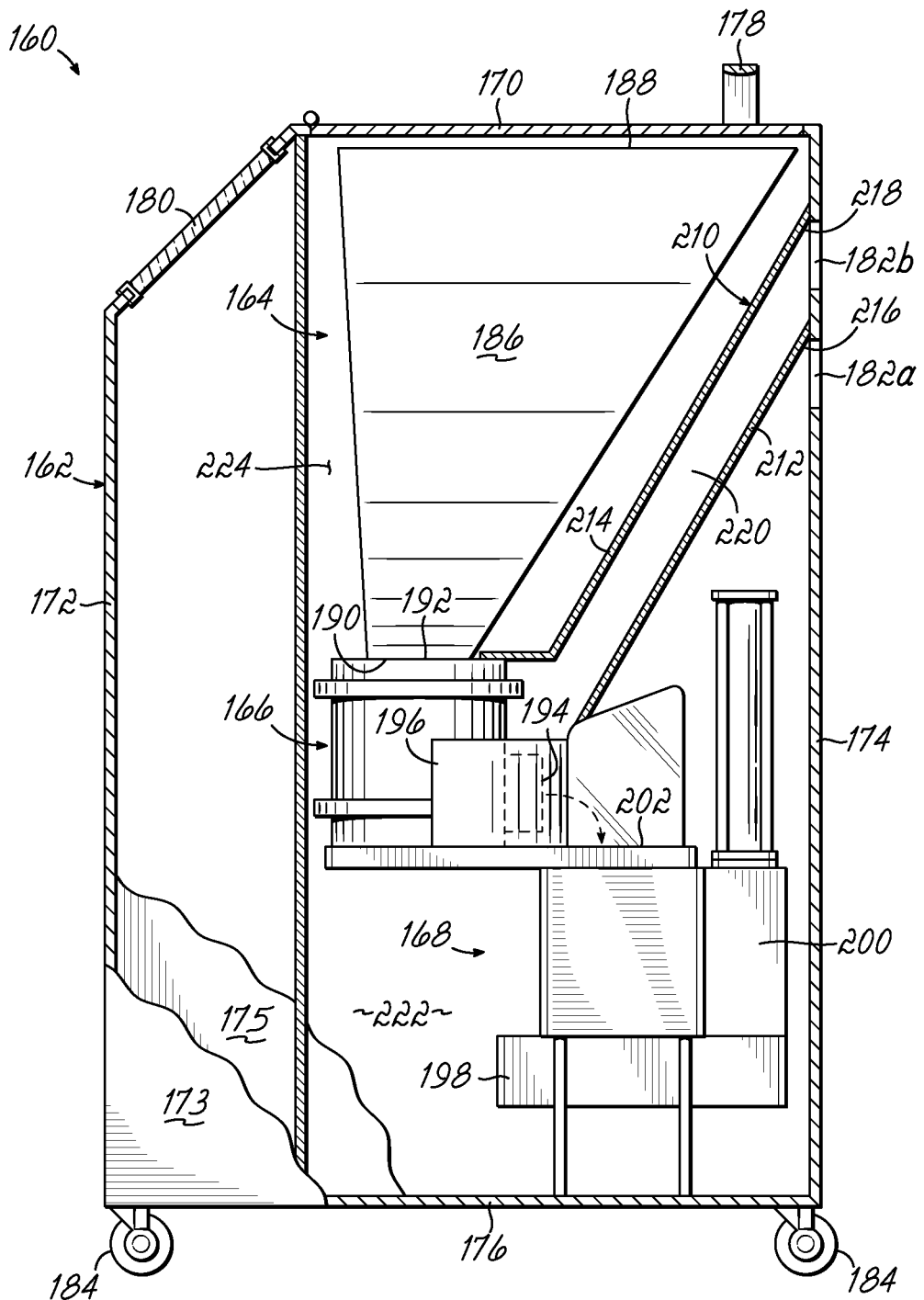
FIG. 9 is a cross-sectional view showing features of a hot melt adhesive system constructed according to a further embodiment of the invention.

Referring next to FIG. 9, a hot melt adhesive system 160 is shown whose components are contained within a single common housing structure, or housing, 162. The hot melt adhesive system 160 includes an adhesive supply 164, a feeder device 166, and an adhesive melter 168, all of which are situated within the housing 162. The adhesive supply 164 can be substantially similar to the adhesive supply 10 described above. Likewise, the feeder device 166 and the adhesive melter 168 can be substantially similar to the feeder devices 14, 60, 100 and the adhesive melters 12, 62 described above.

The housing 162 provides a plurality of panels for enclosing the components therein, including a lid 170, a front panel 172, side panels 173, 175, a rear panel 174, and a bottom panel 176. The lid 170 is hingedly coupled with the front panel 172 and includes a handle 178 for a user to grasp to open and close the lid 170. The front panel 172 includes a window panel portion 180 which includes a window that allows a user to look into the housing 162. Vent openings are provided in the housing 162 to draw in ambient air from near the housing 162 and to allow the escape of heat generated in the housing 162. In particular, lower and upper vent openings 182a, 182b are situated in the rear panel 174 generally near an upper region thereof. The housing 162 is mounted on caster wheels 184 to allow the hot melt adhesive system 160 to be easily moved between locations.

The adhesive supply 164 includes a hopper 186 which is accessible beneath the lid 170. Thus, a user can open the lid 170 and deposit particulate hot melt adhesive material directly into an inlet 188 of the hopper 186. Advantageously, the size of the hopper 186 is generally similar to the size of the opening of the housing 162 revealed when the lid 170 is opened, and thereby the user does not come into contact with the other components of the system 160 inside the housing 162 and beneath the hopper 186.

An outlet 190 of the hopper 186 is coupled with an inlet 192 of the feeder device 166. Thereby, the hopper 186 can contain particulate hot melt adhesive and communicate the particulate hot melt adhesive to the feeder device 166 in a manner similar to any of the embodiments discussed above.

An outlet 194 of the feeder device 166 is configured to provide particulate hot melt adhesive to the melter 168. As shown, the outlet 194 can be situated behind a shield 196, which can be similar to the shields 78, 136 discussed above.

The melter 168 can be like the melters 12, 62 discussed above, for example, and can include heating elements for melting particulate hot melt adhesive material and a heated reservoir 198. The melter 168 can also include a pump 200 associated with the heated reservoir 198 for pumping liquid hot melt adhesive. An inlet 202 is provided for adding particulate hot melt adhesive to the melter 168. The inlet 202 of the melter 168 is configured to receive particulate hot melt adhesive from the outlet 194 of the feeder device 166.

The hot melt adhesive system 160 further includes a chimney 210 disposed within the housing 162, and generally situated between the melter 168 and the adhesive supply 164. The chimney 210 is configured to transfer heat from the melter 168 away from the adhesive supply 164 and the feeder device 166 and to direct the heat out of the housing 162.

The chimney 210 includes a lower chimney panel 212 and an upper chimney panel 214. The lower chimney panel 212 extends from a position generally above the inlet 202 of the melter 168 to the rear panel 174. In particular, distal end 216 of the lower chimney panel 212 connects with the rear panel 174 slightly above the lower vent opening 182a. The upper chimney panel 214 extends from a position also generally above the inlet 202 of the melter 168 to the rear panel 174, with a distal end 218 of the upper chimney panel 214 connecting with the rear panel 174 slightly above the upper vent opening 182b. A chimney air gap 220 is formed between the chimney panels 212, 214. The chimney panels 212, 214 are advantageously constructed of materials that provide thermal insulation to reduce the transfer of heat from the melter 168 to the chimney 210.

Heat emanating from the melter 168 is directed by the chimney 210 out of the vents 182a, 182b. In particular, heat emanating from the melter 168 in the region generally below the hopper 186 may tend to warm a portion of the air within the housing 162. As this warmer air rises from above the melter 168, it will contact the lower chimney panel 212 and rise along the lower chimney panel 212 and be delivered to the lower vent opening 182a. To the extent that heat from the melter 168 is absorbed by the lower chimney panel 212, this heat may tend to warm a portion of the air within the chimney air gap. As this warmer air rises from above the lower chimney panel 212, it will contact the upper chimney panel and rise along the upper chimney panel 214 and be delivered to the upper vent opening 182b. Thereby, the chimney 210 tends to direct heat from the melter 168 out of the housing 162. In addition, the chimney 210 tends to further diminish the amount of heat that is transferred from the melter 168 to the adhesive supply 164 and feeder device 166. This is, in addition to the benefits already provided by the feeder device 166 for diminishing the transfer of heat from the melter 168, as discussed above.

The components of the hot melt adhesive system 160 tend to create two general zones or regions within the housing 162: a heated region 222 and an unheated region 224. The heated region 222 is that region within the housing 162 that is heated by the melter 168. The unheated region 224 is that region within the housing 162 that is not heated by the melter 168, or at least not appreciably heated.

The heated region 222 generally includes the space closely surrounding the melter 168, and includes the space that receives heat from the melter 168. The chimney 210 defines a boundary of the heated region 222, with the space above the chimney 210 not being included in the heated region 222. The feeder device 166, being not positioned directly above the heater elements of the melter 168 and being constructed of materials that provide thermal insulation is generally not heated by the melter 168 and further defines a boundary of the heated region 222.

The unheated region 224 generally includes the spaces distant from the melter 168 and spaces that are not heated by the melter 168. The space above the chimney 210 is part of the unheated region 224. The adhesive supply 164, including the hopper 186, is also part of the unheated region 224. The feeder device 166 is also part of the unheated region 224, as discussed above.

Thus, particulate hot melt adhesive in the hopper 186 and the feeder device 166 is in the unheated region 224 until the feeder device 166 moves that particulate hot melt adhesive into the melter 168. In other words, the feeder device 166 selectively couples the supply of particulate hot melt adhesive between the heated and unheated regions 222, 224 of the hot melt adhesive system 160. The feeder device 166 can be operated to direct particulate hot melt adhesive from the unheated region 224 to the heated region 222, where it is transformed into liquid hot melt adhesive material. Advantageously, this allows particulate hot melt adhesive to stay in particulate form for as long a duration as possible, and to preventing premature melting of the particulate hot melt adhesive in the adhesive supply 164 and in the feeder device 166.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A feeder device for moving particulate hot melt adhesive from an adhesive supply to an adhesive melter, the feeder device comprising:
a body having an inlet and an outlet, and an interior communicating with the inlet and the outlet, the inlet being configured to receive particulate hot melt adhesive from an outlet of the adhesive supply, and the outlet being configured to provide particulate hot melt adhesive to an inlet of the adhesive melter; and
a mechanical agitator positioned in the interior of the body and configured to urge the particulate hot melt adhesive in a flow direction toward the outlet.

2. The feeder device of claim 1, wherein the mechanical agitator is an impeller having a central hub and radially extending vanes, the impeller being rotatable within the interior.

3. The feeder device of claim 2, wherein:
the body further comprises a main portion having a first end and a base surface,
the inlet is proximate the first end, and
the impeller is proximate the base surface.

4. The feeder device of claim 3, wherein the main portion has a generally cylindrical shape.

5. The feeder device of claim 3, further comprising a flow adjustment member operatively coupled with the body and configured to adjust a flow of the particulate hot melt adhesive through the outlet.

6. The feeder device of claim 5, wherein the body further comprises a throat portion extending from the main portion and configured to communicate the particulate hot melt adhesive from the interior to the outlet.

7. The feeder device of claim 6, wherein the flow adjustment member is positioned generally between the throat portion and the main portion.

8. A feeder device for moving particulate hot melt adhesive from an adhesive supply to an adhesive melter, the feeder device comprising:
a body having an inlet and an outlet, and an interior communicating with the inlet and the outlet, the inlet being configured to receive particulate hot melt adhesive from an outlet of the adhesive supply, and the outlet being configured to provide particulate hot melt adhesive to an inlet of the adhesive melter;
a mechanical agitator positioned in the interior of the body and configured to urge the particulate hot melt adhesive in a flow direction toward the outlet; and
a drive mechanism configured to operate the mechanical agitator and move the outlet between a first position and a second position, the first position configured to feed the particulate hot melt adhesive into the adhesive melter.

9. The feeder device of claim 8, wherein the drive mechanism includes a drive device configured to operate the mechanical agitator.

10. The feeder device of claim 8, wherein the drive mechanism includes a drive coupler connected to the mechanical agitator, the drive mechanism being configured to mate with a drive device for operating the mechanical agitator.

11. The feeder device of claim 8, wherein the mechanical agitator is an impeller having a central hub and radially extending vanes, the impeller being rotatable within the interior.

12. A method of moving particulate hot melt adhesive between an adhesive supply containing a bulk quantity of the particulate hot melt adhesive and an adhesive melter for heating and melting the particulate hot melt adhesive into a liquid hot melt adhesive, the method comprising:
introducing the particulate hot melt adhesive into an inlet of a feeder device from the adhesive supply;
operating a mechanical agitator in the feeder device to move the particulate hot melt adhesive in a feed direction toward and through an outlet of the feeder device; and
directing the particulate hot melt adhesive from the outlet into the adhesive melter.

13. The method of claim 12, wherein the mechanical agitator is an impeller that includes vanes, and
wherein operating a mechanical agitator further includes rotating the impeller so that the vanes contact and move the particulate hot melt adhesive in the feed direction.

14. The method of claim 12, wherein the feeder device includes a body having a main portion and a throat portion extending from the main portion and communicating with the outlet, and
wherein moving the particulate hot melt adhesive in a feed direction includes directing the particulate hot melt adhesive out of the body and through the throat portion and the outlet.

15. The method of claim 12, further comprising moving the outlet of the feeder device into a first position proximate the inlet of the adhesive melter prior to moving the particulate hot melt adhesive into the adhesive melter.

16. The method of claim 15, wherein moving the outlet includes rotating the outlet with respect to the adhesive melter.

17. The method of claim 15, wherein operating the mechanical agitator and moving the outlet include using a drive device to operate the mechanical agitator and to move the outlet.

18. The method of claim 12, further comprising moving the outlet of the feeder device from a first position to a second position away from the inlet of the adhesive melter after directing the particulate hot melt adhesive into the adhesive melter.

19. The method of claim 18, wherein moving the outlet includes rotating the outlet with respect to the adhesive melter.

20. The method of claim 18, wherein operating the mechanical agitator and moving the outlet include using a drive device to operate the mechanical agitator and to move the outlet.

21. The method of claim 12, wherein the adhesive supply, the feeder device, and the adhesive melter are disposed within a housing structure and a chimney is situated between the adhesive supply and the adhesive melter, and
the method further comprises directing heat from the adhesive melter out of the housing structure using the chimney.

22. The method of claim 21, wherein the housing structure includes a heated region heated by the adhesive melter and an unheated region, and
the method further comprises maintaining the particulate hot melt adhesive material in the unheated region until the particulate hot melt adhesive is directed into the adhesive melter.

23. A hot melt adhesive system comprising:
an adhesive supply configured to contain a bulk quantity of particulate hot melt adhesive and having an outlet;
an adhesive melter configured to melt the particulate hot melt adhesive into a liquid hot melt adhesive and having an inlet; and a feeder device configured to move between a first position such that the particulate hot melt adhesive is directed from the adhesive supply to the adhesive melter and a second position such that particulate hot melt adhesive is not directed to the adhesive melter, the feeder device including a body having an inlet and an outlet and an interior communicating with the inlet and the outlet, the inlet being configured to receive particulate hot melt adhesive from the outlet of the adhesive supply, and the outlet being configured to provide particulate hot melt adhesive to the inlet of the adhesive melter in the first position.

24. The hot melt adhesive system of claim 23, wherein the feeder device provides a physical, thermal separation between the adhesive supply and the adhesive melter.

25. The hot melt adhesive system of claim 23, wherein an air gap is provided between the adhesive melter and the feeder device and the air gap thermally separates the adhesive melter from the feeder device and from the adhesive supply.

26. The hot melt adhesive system of claim 25, wherein the interior of the feeder device is offset from a position directly above the inlet of the adhesive melter.

27. The hot melt adhesive system of claim 25, wherein the body of the feeder device further comprises a generally cylindrical main portion and a throat portion extending from the main portion, the throat portion being configured to communicate the particulate hot melt adhesive from the interior to the outlet.

28. The hot melt adhesive system of claim 23, wherein the feeder device further includes a mechanical agitator positioned in the interior and configured to urge the particulate hot melt adhesive in a flow direction toward the outlet.

29. The hot melt adhesive system of claim 28, wherein the mechanical agitator comprises an impeller having a central hub and radially extending vanes, the impeller being rotatable within the interior.

* * * * *